US008055555B2

(12) United States Patent
Todd et al.

(10) Patent No.: US 8,055,555 B2
(45) Date of Patent: Nov. 8, 2011

(54) MEDIATION DEVICE FOR SCALABLE STORAGE SERVICE

(75) Inventors: Stephen Todd, Shrewsbury, MA (US); Michel Fisher, Natick, MA (US); Paul Bober, Lexington, MA (US); Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 1685 days.

(21) Appl. No.: 09/962,408

(22) Filed: Sep. 25, 2001

(65) Prior Publication Data
US 2003/0061129 A1 Mar. 27, 2003

(51) Int. Cl.
*A01Q 5/02* (2006.01)
*G06Q 10/00* (2006.01)
(52) U.S. Cl. .......................................... 705/29; 705/7.36
(58) Field of Classification Search .................... 705/29
See application file for complete search history.

(56) References Cited

U.S. PATENT DOCUMENTS

| | | | | |
|---|---|---|---|---|
| 5,550,816 A * | 8/1996 | Hardwick et al. | ............ | 370/397 |
| 5,822,780 A * | 10/1998 | Schutzman | .................... | 711/165 |
| 5,835,724 A * | 11/1998 | Smith | ............................ | 709/227 |
| 5,884,284 A | 3/1999 | Peters et al. | | |
| 5,918,229 A * | 6/1999 | Davis et al. | .................. | 705/27.1 |
| 5,978,577 A * | 11/1999 | Rierden et al. | ......................... | 1/1 |
| 6,012,032 A * | 1/2000 | Donovan et al. | .................. | 705/1 |
| 6,148,335 A * | 11/2000 | Haggard et al. | ............. | 709/224 |
| 6,178,529 B1 * | 1/2001 | Short et al. | ....................... | 714/51 |
| 6,260,120 B1 * | 7/2001 | Blumenau et al. | ............ | 711/152 |
| 6,308,206 B1 * | 10/2001 | Singh | .......................... | 709/223 |
| 6,345,288 B1 * | 2/2002 | Reed et al. | .................... | 709/201 |
| 6,411,943 B1 * | 6/2002 | Crawford | ...................... | 705/400 |
| 6,421,737 B1 * | 7/2002 | Stone et al. | .................... | 719/318 |
| 6,430,611 B1 * | 8/2002 | Kita et al. | ..................... | 709/223 |
| 6,449,739 B1 * | 9/2002 | Landan | ........................ | 714/47.2 |
| 6,483,912 B1 * | 11/2002 | Kalmanek et al. | ............. | 379/219 |
| 6,516,350 B1 * | 2/2003 | Lumelsky et al. | ............ | 709/226 |
| 6,560,611 B1 * | 5/2003 | Nine et al. | .............................. | 1/1 |
| 6,580,611 B1 | 5/2003 | Nine et al. | | |
| 6,615,258 B1 * | 9/2003 | Barry et al. | .................... | 709/223 |
| 6,649,315 B1 * | 11/2003 | Takasaki | ..................... | 430/110.3 |
| 6,714,976 B1 * | 3/2004 | Wilson et al. | ................. | 709/224 |
| 6,732,167 B1 * | 5/2004 | Swartz et al. | ................. | 709/223 |

(Continued)

OTHER PUBLICATIONS

Jenkins, Ron, "Why Web-based Network Monitoring? Leveraging the Platform," International Journal of Network Management, vol. 9, Issue 3, May 1999, pp. 175-183.

(Continued)

*Primary Examiner* — Mussa Shaawat
(74) *Attorney, Agent, or Firm* — Daly, Crowley, Mofford & Durkee, LLP

(57) ABSTRACT

A service provider management system (SPMS) that connects to storage resources in a datacenter controlled by a service provider and a database that stores information about the datacenter and customers that receive the storage resources as a service. The SPMS enables the service provider to allocate storage resources to a customer and to assign ownership to billable devices, such as disks, volumes, ports, and so forth, as well as to generate billing information based on hardware configuration and customer usage. The SPSM is supported on a server architecture, which includes a Web server that exports a first interface to the service provider to enable the service provider to manage the data storage resources to which the SPMS is connected, and a second interface to the customer to enable the customer to manage the allocated data storage resources directly.

20 Claims, 11 Drawing Sheets

U.S. PATENT DOCUMENTS

| | | | |
|---|---|---|---|
| 6,754,664 B1* | 6/2004 | Bush .................................. | 1/1 |
| 6,779,016 B1* | 8/2004 | Aziz et al. ...................... | 709/201 |
| 6,785,794 B2* | 8/2004 | Chase et al. .................. | 711/170 |
| 6,788,649 B1* | 9/2004 | Dugan et al. .................. | 370/254 |
| 6,795,830 B1* | 9/2004 | Banerjee et al. ...................... | 1/1 |
| 6,816,905 B1* | 11/2004 | Sheets et al. .................. | 709/226 |
| 6,826,580 B2* | 11/2004 | Harris et al. .......................... | 1/1 |
| 6,829,685 B2* | 12/2004 | Neal et al. ...................... | 711/153 |
| 6,845,154 B1* | 1/2005 | Cave et al. ............... | 379/265.02 |
| 6,993,632 B2* | 1/2006 | Kruckemyer et al. ........ | 711/145 |
| 6,993,657 B1* | 1/2006 | Renner et al. ................. | 713/182 |
| 7,010,493 B2* | 3/2006 | Yamamoto et al. ................. | 705/1 |
| 7,082,462 B1* | 7/2006 | Matsunami et al. .......... | 709/223 |
| 7,149,797 B1* | 12/2006 | Weller et al. ................. | 709/223 |
| 7,370,013 B1* | 5/2008 | Aziz et al. ....................... | 705/40 |
| 2002/0095547 A1* | 7/2002 | Watanabe et al. ............. | 711/114 |
| 2002/0112113 A1* | 8/2002 | Karpoff et al. .................... | 711/4 |
| 2002/0143791 A1* | 10/2002 | Levanon et al. ............... | 707/200 |
| 2002/0143888 A1* | 10/2002 | Lisiecki et al. ............... | 709/214 |
| 2003/0061057 A1 | 3/2003 | Todd et al. | |
| 2003/0061129 A1* | 3/2003 | Todd et al. ...................... | 705/29 |
| 2003/0097445 A1* | 5/2003 | Todd et al. ..................... | 709/226 |
| 2003/0115073 A1* | 6/2003 | Todd et al. ......................... | 705/1 |
| 2003/0135385 A1* | 7/2003 | Karpoff .............................. | 705/1 |
| 2005/0049903 A1* | 3/2005 | Raja .................................. | 705/7 |

OTHER PUBLICATIONS

Guiagoussou, M. H.; Boutaba, R.; Kadoch, M., "A Java API for Advanced Faults Management," IEEE/IFIP International Symposium on Integrated Network Management Proceedings, May 14-18, 2001, pp. 483-498.

"Service Provider," Newton's Telecom Dictionary, Harry Newton, Feb. 2002, p. 661.

"HighGround SRM Enterprise Edition 4.0", System News, Article #3577, vol. 38, Issue 3, 8 pages, Apr. 16, 2001.

"New SRM 3.0 Enterprise Edition Now Downloadable", Sunbelt W2Knews Electronic Newsletter, 7 pages, Nov. 5, 1998.

"Storage Management Best Practices with Sun HighGround Storage Resource Manager Software", Sun Microsystems White Paper, 18 pages, Jul. 2001.

* cited by examiner

| Layer | Input from above | Output to above | |
|---|---|---|---|
| Browser | | | |
| Presentation | URLs + form data | HTML and Javascript | |
| Business Functions | XML tree + Primitive data | XML tree + Primitive data | Exports operation-centric view. Hides data model from presentation layer |
| DBAPI | XML tree + Per-field set functions | XML tree + Per-field get functions | Exports data-centric view. Contains an object corresponding to each DB table plus additional views as needed. Hides data access details (SQL and API calls) from business functions layer |

FIG. 8

| Category | Privilege Name | Description |
|---|---|---|
| User and Domain Management | A/M/D domain<br>view domain<br>A/M/D user | |
| Host Registration | A/M/D host group<br>A/M/D host<br>A/M/D HBA | |
| Device Allocation | View allocation<br>reserve/unreserve volumes<br>alloc/dealloc volumes | view allocated volumes<br>reserve volumes for a domain -- this may require user intervention to create volumes<br>once volumes are assigned to the domain they must be allocated to a particular host |
| | modify volume | change between BCV, standard, R1, R2, etc. |
| Work Order | view work orders<br>assign | all users have the ability to re-assign a work orders assigned to themselves. The assign privilege allows them to re-assign a work order that is currently assigned to someone else. |
| Metering | view metering | |

FIG. 10

MEDIATION DEVICE FOR SCALABLE STORAGE SERVICE

BACKGROUND

The invention relates generally to management of data storage resources.

Over the past decade, there have been changes in the marketplace that have had a significant impact on the corporate product delivery environment. Companies and corporate organizations that were at one time totally self-sufficient have chosen to focus development resources solely on products and services that relate to core competencies, and out-source all others. For example, companies that were not in the database business but once had their own proprietary databases have migrated to the use of off the shelf databases from software suppliers.

Further changes are occurring as such companies are faced with new competitive pressures and challenges. Efforts to scale infrastructure to meet ever-increasing demands in areas of bandwidth, compute power and storage are placing tremendous burdens on corporate enterprises. Also, because the World Wide Web has enabled commercial entities with little overhead and few resources to create the appearance of a business of the same type and scale as a much larger company, larger companies have found that they cannot afford the cost of the infrastructure changes if they are to remain competitive. Also of concern is the rising cost of services.

Consequently, companies looking for ways to do more with less are re-evaluating internal services to further refine their market focus, thus making way for a new set of out services and service providers, including the following: (i) the Internet Service Provider (ISP) to provide connectivity; (ii) the Storage Service Provider (SSP) to provide storage resources, e.g., allocate usage of storage devices; (iii) the Application Service Provider (ASP) to provide compute platforms and applications; (iv) the Floorspace Service Provider (FSP) to provide floorspace for rent with all the necessary connections; and the Total Service Provider (TSP) to provide all of the services of providers (i) through (iv) in one package. All of these service providers can be referred to generally as "xSPs".

In addition, just as companies are relying more on outsourcing of products and services, Information Technology (IT) departments within the largest of companies look to reposition themselves as TSPs for their internal customers. They may use outside service providers, but that out-sourcing will be hidden from the internal user. This service delivery approach translates into an environment of tiered service providers—each one providing the same services to each of their customers.

SUMMARY

In one aspect, the invention provides methods and apparatus, including computer program products, for providing data storage resources as a service. The methods include a method that provides for connecting to data storage resources in a datacenter controlled by a service provider, enabling the service provider to allocate the data storage resources to one or more customers and maintaining information about the datacenter and customers to whom the service provider has allocated the data storage resources.

Particular implementations of the invention may provide one or more of the following advantages.

The invention provides an xSP with a turnkey package that enables that xSP to provide storage and storage-related services as a business. The xSP and the customer of the xSP (CxSP) can provide the same turnkey package to their customers.

Other features and advantages of the invention will be apparent from the following detailed description and from the claims.

DESCRIPTION OF DRAWINGS

FIG. 8 is a table that represents the SPMS server software as a modularized, three layer architecture.

FIG. 10 is a table that shows the SPMS server users' privileges.

Like reference numbers will be used to represent like elements.

DETAILED DESCRIPTION

Figure 1:
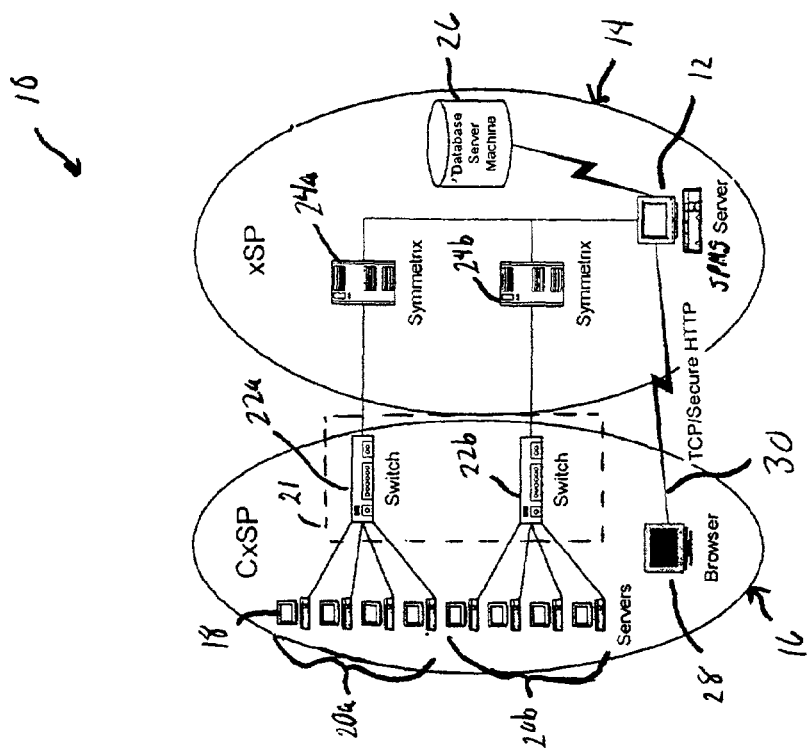
FIG. 1 is a depiction of an exemplary storage service delivery and management environment including a Service Provider Management System (SPMS) server that enables an xSP to provide storage and storage-related services to a customer (CxSP) as a service.

FIG. 1 illustrates an exemplary storage service delivery and management environment 10. Storage provisioning and service management are enabled by a device referred to hereinafter as a Service Provider Management System (SPMS), which is implemented as a server architecture and thus operates on a server machine shown as the SPMS server 12. The SPMS provides the necessary tools to allow service providers to grow a business around their ever-growing datacenters.

There are two target users of the SPMS server 12: an xSP 14 and a customer of the xSP (or "CxSP") 16. In the embodiment shown, the CxSP 16 includes a plurality of host servers 18. The servers 18 are connected to an interconnect 21, which can be a switch-based or hub-based configuration, or some other Storage Area Network (SAN) interconnect. In one embodiment, the interconnect 21 includes one or more switches 22, shown in the figure as a pair of switches 22a and 22b. Thus, some of the servers 18 in a first group 20a are connected to the switch 22a, and the other servers 18 (in a second group 20b) are connected to the other switch 22b. The switch 22a is connected to a first storage system 24a and the switch 22b is connected to a second storage system 24b. Collectively, the storage systems 24 represent a datacenter within the xSP. Each storage system 24 includes one or more data storage resources, such as a storage device (e.g., disk) or a storage-related service (e.g., data mirroring). For illustrative purposes, the storage systems 24 are shown as Symmetrix storage systems, which are available from EMC Corporation, and the operation of the server 12 is described within the context of a scalable Symmetrix storage infrastructure. However, the storage infrastructure could include other storage system platforms and media types. It will be assumed that the storage in the Symmetrix systems 24 has been segmented into usable chunks.

The storage systems 24 each are connected to the SPMS server 12. Also connected to the SPMS server 12 and residing in the xSP 14 is a database server 26. The database server can be implemented as an Oracle database server or any other commercially available database system. The database server 26 is used to store hardware management and customer information.

As will be further described below, SPMS server architecture can be configured for a number of different service model permutations. In one service model, the CxSP owns the servers and perhaps the switches (as shown in the FIG. 1), which are connected to ports on the storage systems 24 maintained by the xSP, and may or may not allow integration of SPMS components with those servers. In another service model, the xSP owns the servers 18 and/or the switches 22, in addition to the storage systems 24.

In addition to the servers 18 and switches 22, the CxSP 16 includes a browser/GUI 28, which is used as a CxSP console and allows an administrator for the CxSP 16 to perform tasks such as viewing the amount of used and free storage, assigning storage to the servers 18, viewing usage reports and billing information, reports on the general health of the CxSP storage, and other information. The CxSP 16 can run browser sessions from multiple clients simultaneously. The connection from the SPMS client browser 28 to the SPMS server 12 is a TCP connection running secure HTTP, indicated by reference numeral 30. The connection 30 can be a point-to-point Ethernet intranet that is directly cabled from the CxSP 16 to the xSP 14, or some other type of point-to-point network connection that supports TCP/IP transmissions. It should be noted that the SPMS server 12 actually exports two HTTP interfaces: one for the CxSP administrator (via the browser/GUI 28) and another for an xSP administrator (also using a Web-based GUI, not shown).

In one embodiment, the SPMS server 12 is a Solaris machine running an Apache Web server, as will be described. The server 12 communicates with the database server 26 to store and retrieve customer and storage system (e.g., Symmetrix) information. Of course, the database and the SPMS software could run on the same server. In an xSP environment that maintains multiple SPMS servers, however, the database should be accessible from any one of those SPMS servers located in the same xSP environment, as will be described later.

The SPMS server 12 links storage usage to customer accounts. The SPMS server 12 accomplishes this linkage by associating customer account information with the World Wide Name (WWN) of the Host Bus Adapter (HBA) that is installed on each server 18 in the CxSP 16 and uses the storage, and storing each association in the database 26.

Thus, the SPMS server 12 connects to storage (the storage to be managed, e.g., individual storage systems or systems that may belong to a datacenter or SAN) and the database 26 to store information about the storage and the customers who are receiving the storage as a service. As will be described in further detail below, the SPMS server 12 allows both xSPs and CxSPs to view, change and request storage-related information, as well as assign ownership to billable devices, for example, disks, volumes, ports, switches, servers, server Host Bus Adaptors (HBAs), among others. Multiple levels of ownership can be assigned, including ownership by the service provider (as far as who is responsible for administration of that device), ownership by the customer of the service provider, and sharing of devices by multiple customers (e.g., port-sharing). The SPMS server 12 also allows a service provider to generate billing information based on hardware configuration and customer usage of the configuration, and track events and services (such as mirroring or data backup, for example).

Figure 2:
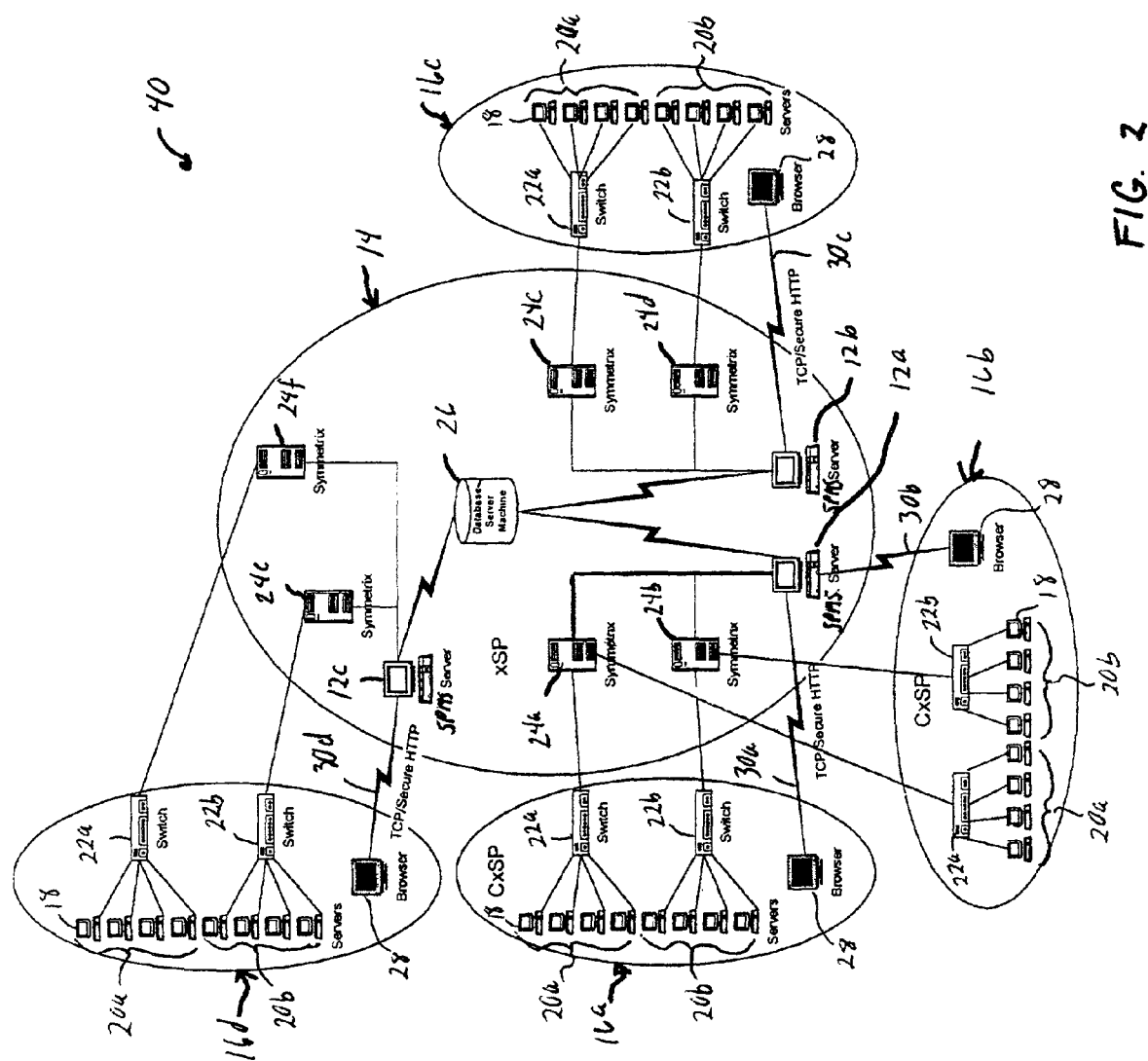
FIG. 2 is a depiction of an exemplary multi-customer storage service delivery and management environment in which multiple SPMS servers are deployed within an xSP.

FIG. 2 illustrates a multi-customer environment 40 in which multiple clients 16 are being served by the xSP site, which has been scaled to include multiple storage system systems 24 as well as multiple SPMS servers 12. The multiple CxSPs 12, shown in this example as four CxSPs 16*a*, 16*b*, 16*c* and 16*d*, are supported within the environment of the xSP 14. The xSP maintains three SPMS servers, 12*a*, 12*b* and 12*c*, each of which is connected to and manages some subset of available storage systems 24*a*, 24*b*, . . . , 24*f*. In particular, server 12*a* is connected to storage systems 24*a* and 24*b*, the server 12*b* is connected to storage systems 24*c* and 24*d*, and the server 12*c* is connected to storage systems 24*e* and 24*f*.

Servers 18 and switches 22 belonging to CxSP 16*a* and CxSP 16*b* are connected to the Symmetrix units 24*a*, 24*b*, as shown, which in turn are connected to the SPMS server 12*a*. The browsers in both CxSPs 12*a* and 12*b* are able to communicate with the SPMS server 12*a* over their respective TCPs connections 30*a* and 30*b* to the SPMS server 12*a*. Therefore, one or more clients can be added to the ports on the Symmetrix units, as well as to an SPMS server that is connected to and manages those Symmetric units. In addition, new storage systems can be added at the xSP site. Each new box would need to be connected to an SPMS server. The xSP also has the option of scaling the solution further by introducing new SPMS servers that are connected to new Symmetrix units, as is illustrated with the addition of servers 12*b* and 12*c*. Each new SPMS server has access to the database server 26. Preferably, each SPMS server is responsible for a certain set of storage systems so that there is no overlap among the SPMS servers and the storage systems for which they are responsible. Additionally, if the xSP is concerned about failure of the SPMS server or database server, the SPSM servers and database can be clustered for high availability. The xSP has the option of sharing multiple ports among several customers or dedicating ports exclusively to specific customers.

Figure 3:
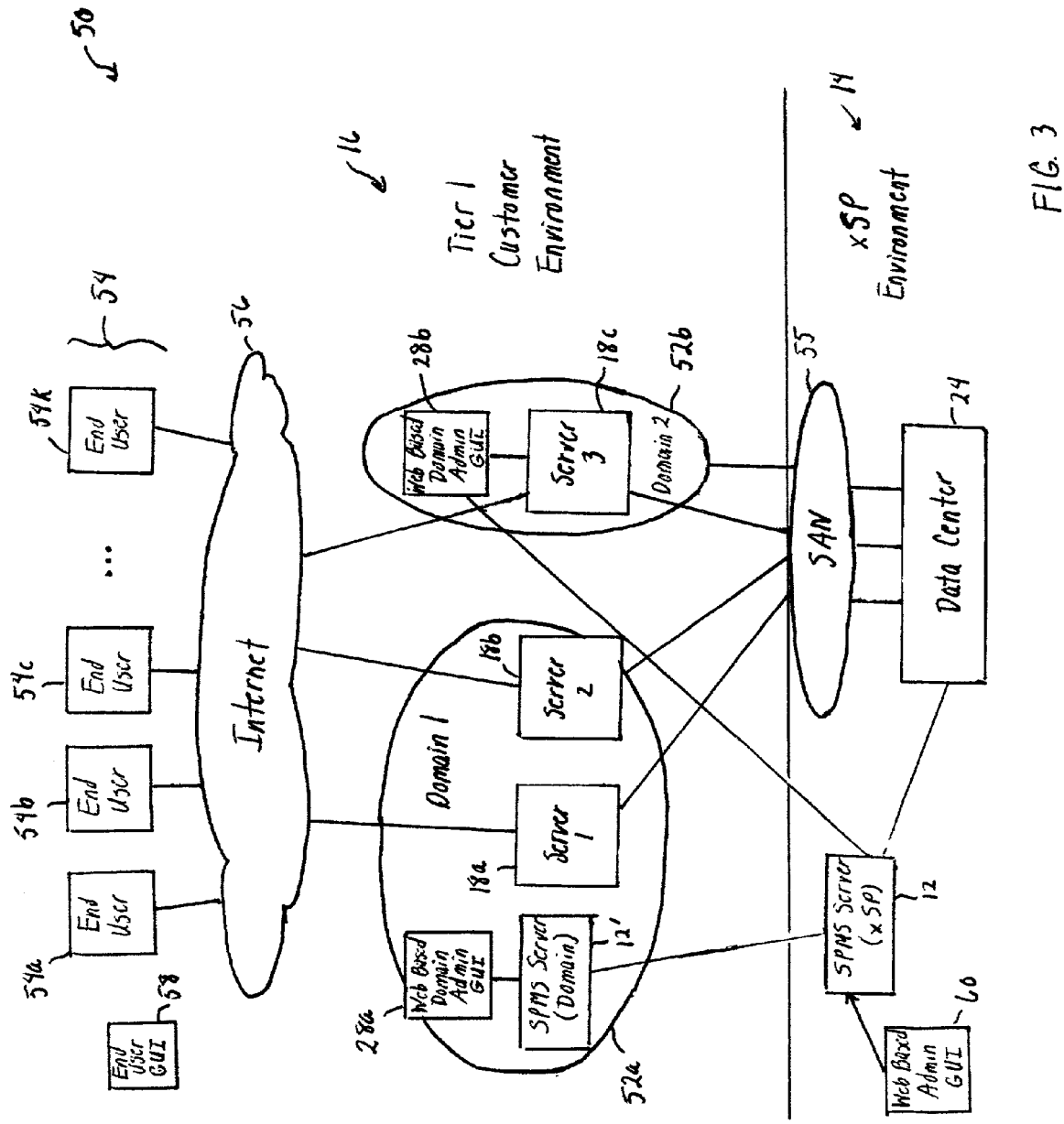
FIG. 3 is a depiction of an exemplary tiered storage service delivery and management environment.

FIG. 3 shows a tiered, managed storage infrastructure environment 50 that includes one or more customer domains 52, e.g., domains 52*a* ("domain 1") and 52*b* ("domain 2"), and one or more end user systems 54, e.g. end user systems 54*a*, 54*b*, 54*c*, . . . , 54*k*. Each customer domain 52 is a logical collection of one or more "domain" servers 18 that are tracked for a single customer. In the example shown, the domain 52*a* includes servers 18*a* and 18*b*, and domain 52*b* includes server 18*c*. The servers 18*a*, 18*b*, and 18*c* are connected to the datacenter 24 via a SAN 55. In this illustration, the SAN 55 resides in the xSP environment 14 and includes one or more SAN interconnection devices such as Fibre Channel switches, hubs and bridges. A single customer may have multiple domains. In this environment, the xSP SPMS Server12 provides to each of the customer domains 52 a Web interface to available storage and storage services in the datacenter 24. The server 12 also tracks usage of each of the services. Associated with each of the services is one of end user systems 54, which communicate with the servers 18*a*, 18*b*, and 18*c* over the Internet 56 using their own GUIs, represented in the figure by end user GUI 58, and one of domain Administrators (via Administration GUIs 28*a* and 28*b*). The services can include, but need not be limited to, the following: storage configuration, which create volumes and place the volumes on a port; storage-on-demand to enable the end user to allocate storage in a controlled fashion; replication to enable the end user to replicate data from one volume to another in controlled fashion; disaster tolerance management service, if disaster tolerance is available and purchased by the customer; Quality of Service (QoS), which is provided only to the Administrator for controlling performance access; management of data backup services; logging, which logs all actions that take place on the SPMS Server; data extract/access—data is stored in the database and can be accessed or extracted by the Service Provider to pass the information into the billing system. The xSP Adminstrator uses an xSP Web based Administration GUI 60 as an interface to manage the entire environment.

The Web based Domain Administration GUIs 28a and 28b are the Web based interfaces used by the domain administrators for domains 52a and 52b, respectively. Each connects directly to the Service Provider's SPMS server 12 or, alternatively, to a local domain SPMS server (shown as SPMS server 12') and proxies into the xSP environment.

The end user GUI 58 allows a domain end-user, e.g., 54a, to provide a business function to users of that business function. The end-user 54 can also provide storage services through this GUI and a domain SPMS server such as the domain SPMS server 12'.

Thus, the SPMS server 12 can be adapted for deployment in the customer and even the end-user environment, enabling the end-user to cascade out the services. Of course, the SPMS server provides different functionality in the xSP, customer and end user modes.

Figure 4:
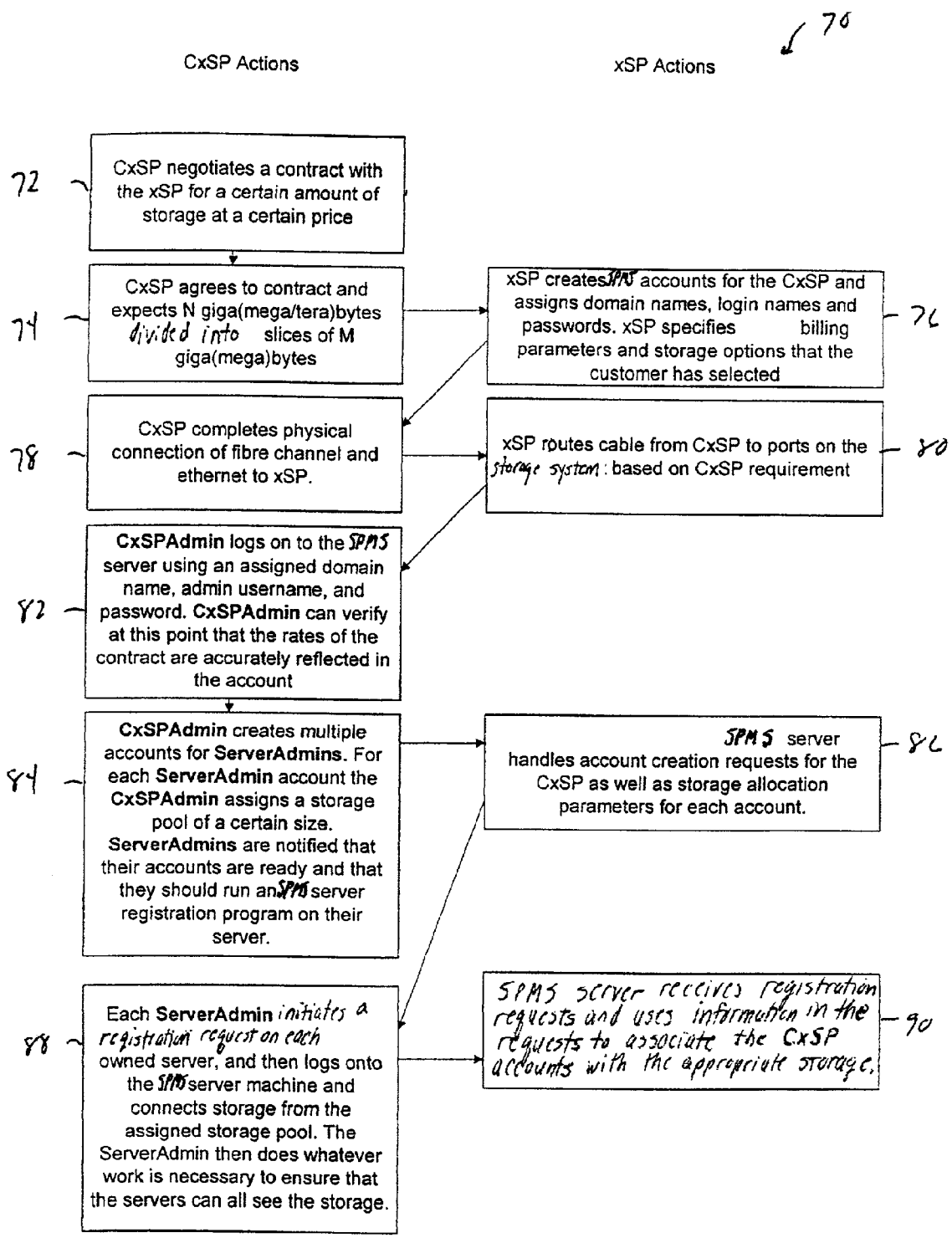
FIG. 4 is a flow diagram illustrating interaction between an xSP and a "new" CxSP.

Before turning to the specifics of the software architecture, it may be helpful to examine the interaction between a new CxSP and an xSP SPMS server when that CxSP acquires storage for the servers in the CxSP environment. FIG. 4 shows a process of associating storage with a CxSP 70 and involves both CxSP actions and xSP actions. The main actions on the part of the CxSP are performed by the Server Administrator ("ServerAdmin") in charge of administration of the storage connected to a given server, and the CxSP Administrator ("CxSPAdmin") in charge of procuring more storage and authorizing it for use by the Server Administration and given server. This process flow assumes that the xSP has already acquired storage and divided that storage into partitions and sizes.

Referring to FIG. 4, the CxSP negotiates a contract with the xSP for a certain amount of storage at a certain price (step 72). Once the parties have agreed to the contract (step 74), the xSP creates SPMS accounts for the CxSP and assigns to the CxSP domain names, login names and passwords for use by the CxSP, and specifies billing parameters and storage options that the CxSP has selected under the agreement (step 76). The CxSP completes the physical connection (e.g., Fibre Channel and Ethernet) to the xSP machines (step 78). The xSP provides the physical connection from the CxSP equipment (e.g., the switches) to ports on the storage system based on the CxSP requirements (step 80). The CxSPAdmin logs onto the SPMS server using an assigned domain name, user name and password, and verifies that the contract terms (e.g., rates) are accurately specified in the account (step 82). The CxSPAdmin creates multiple accounts for ServerAdmins. For each ServerAdmin account, the CxSPAdmin assigns a storage pool of a certain size. The CxSPAdmin notifies the ServerAdmins that their accounts are ready and that they should run an SPMS server registration program on their respective servers (step 84). The SPMS server handles account creation requests for the CxSP as well as storage allocation parameters for each account (step 86). Each ServerAdmin initiates a registration request on each owned server (using the registration program) and logs onto the SPMS server to connect storage from the assigned pool. The ServerAdmin does whatever work is needed to ensure that the servers can see all of the storage allocated to those servers (step 88). The SPMS server receives the registration requests of each server, and uses information in the registration requests to associate the CxSP accounts with the appropriate storage (step 90).

Figure 5:
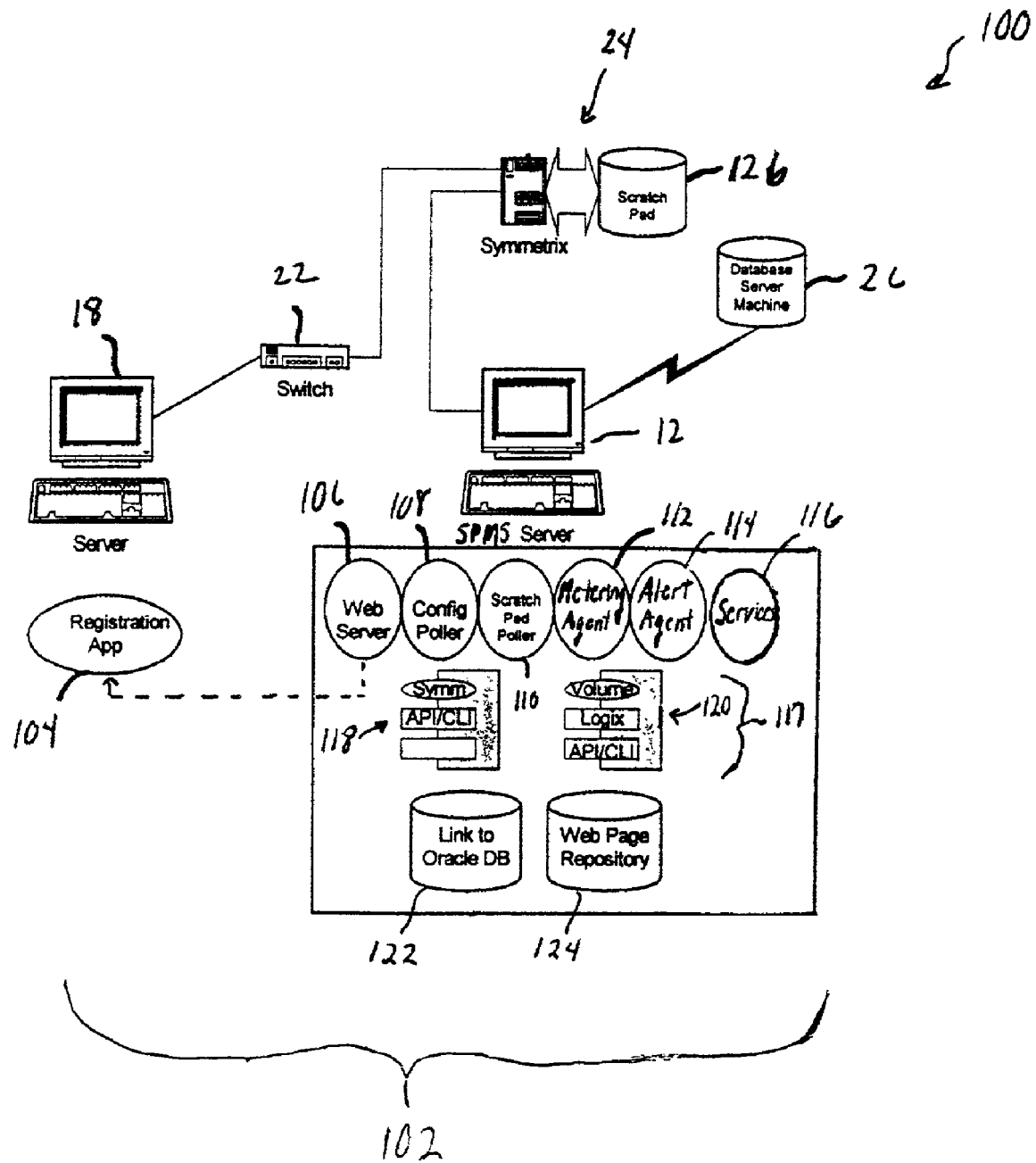
FIG. 5 is a block diagram of an exemplary SPMS server software architecture.

FIG. 5 shows a simple system configuration 100, with a detailed view of the SPMS server software 102. The SPMS software 102 includes a number of components, including an SPMS registration application (SRA) 104, which resides in a tool repository on the server 12, but is executed on each CxSP server 18 attached to the storage 24, as will be described, and a Web server 106. Also included are various daemons, including a configuration poller 108, a scratch pad configuration poller 110, a metering agent 112 and an alert agent 114, as well as services 116. The SPMS software 102 further includes utilities 117, for example, where Symmetrix storage systems are used, a Symmetrix Application Program Interface (API) and/or Command Line Interface (CLI) 118 and Volume Logix API/CLI 120, as well as EMC Control Center (ECC) and scratch pad utilities (not shown). Further included in the software 102 is a link 122 to the database 26 and a Web page repository 124.

It will be appreciated from the system depiction of FIG. 5, as well as FIGS. 1-3, that the SPMS server is not directly connected to the servers 18 that use the storage 24. Because the SPMS server needs information about those servers and associated host bus adapters (HBAs) which are connected to the storage, a mechanism which enables an indirect transfer of information from each server 18 to the SPMS server 12 is required. The storage system 24 includes a "scratch pad" 126, which provides for just such a mechanism. In the described embodiment, the SPMS scratch pad is a storage location on the storage system 24 that is used as a temporary holding device through which information is exchanged between the servers 18 and the SPMS server 12. This storage location can be either on the storage media (e.g., on a disk) or in memory of the storage system 18, or any other device "owned" by the xSP and to which the server 18 has access. A scratch pad utility (not shown) is used to read and write to the SPMS scratch pad 126.

The SPMS Web server 106 serves HTML pages to CxSP administrators as well as xSP administrators. The Web server architecture is made up of the following three areas: i) a user domain configuration module, which determines which users can access the Web server 106 and what permissions they have; ii) "back-end" modules which correlate to all of the software logic needed to access the Web pages, execute scripts, etc.; and iii) an external tool repository that contains tools that can be run on the CxSP machines, e.g., the SRA 104, as well as value-added (and chargeable) software for the CxSP to download and run on CxSP servers.

The configuration poller 108 is a process that constantly polls the ports to discover new Symmetrix units that have been added to the xSP site and checks for changes in currently managed Symmetrix units. Any additions are stored in the database and configurations that change are updated in the database. In the described embodiment, the configuration poller 108 directly monitors Symmetrix devices, but can be designed to monitor any device.

The scratch pad poller 110 is a process whose job it is to poll all connected Symmetrix scratch pads, and is used to collect in-bound scratch pad information as well as direct outbound information to the scratch pad 126. In particular, it continually checks for transmit requests from registration applications. It retrieves each incoming request, validates the user and, if a valid request, causes the registration information to be stored in the database and a status to be returned to the registration application via the scratch pad, as will be described. Additionally, if the scratch pad poller detects a new Symmetrix, it creates a scratch pad for that Symmetrix. The scratch pad poller polling interval is user-defined.

The metering agent 112 is responsible for sampling the latest storage system configuration information for the purpose of storing metering records in the SPMS database 26. This information could be, for example, a daily snapshot of the storage system configurations, or more frequent snapshots of storage system performance information. The metering agent 112 performs the following tasks. It finds all connected storage systems at start-up, and stores the IDs of those systems in the database 26. It creates "meter-able" objects or class files, converts the objects to XML, and stores the XML into the SPMS database 26. The metering agent may choose to store the objects directly in the database or go through the SPMS Web server 106. The "meter-able" objects can be, for example, directors, ports, disks, and volumes. The metering agent is programmed to wake up at a user-defined interval.

The SPMS server 12 employs a mechanism for defining thresholds based on available and allocated capacity. The alert daemon 114 is responsible for monitoring these thresholds and sending out email alerts when they are triggered. The alert daemon 114 awakens periodically, and examines the precondition for each alert in an ALERTS table maintained in the database 26. This is done through database operations (i.e., the alert daemon 114 will rely on the configuration poller 108 to keep the database view of the configuration up-to-date). The alert daemon 114 may be generalized to allow alerts to be defined by plug-in Java classes.

The daemons can execute as separate processes or as individual threads inside a single process.

The services 116 include such services as an Oracle DB engine, Oracle reporting services and notification services. Other services can include configuration, backup, mirroring, and so forth.

The SPMS server uses the Symmetrix API and/or CLI 118 to gather configuration and performance information from the Symmetrix. For example, the CxSP server admininstrator may wish to query the SPMS server 12 about the health of the devices on the server. When this request hits the Web server 106, the SPMS server 12 makes an API call to the appropriate storage system 24 to fetch the information. The SPMS server 12 uses Volume Logix utilities 120 for both viewing and setting WWN-to-volume mapping information.

The SPMS server 12 uses the link 122 to access the Oracle database 26 in order to store customer account and billing information, storage system utility and performance information, as well as other information, in the database.

The Web page repository 124 stores HTML Web pages that the Web server 106 serves to the clients, whether they be CxSP administrators or xSP administrators. These Web pages thus take input from the xSP or CxSP user in response to requests to create user accounts, assign storage to servers, and other requests. For example, the Web pages allow the user to run reports to view all of the "meter-able" aspects of assigned storage. Certain HTML pages can allow for the export of information to a third party tool such as a billing application. In one embodiment, style sheets take database information in an XML form and generate a display for the user.

Figure 6:
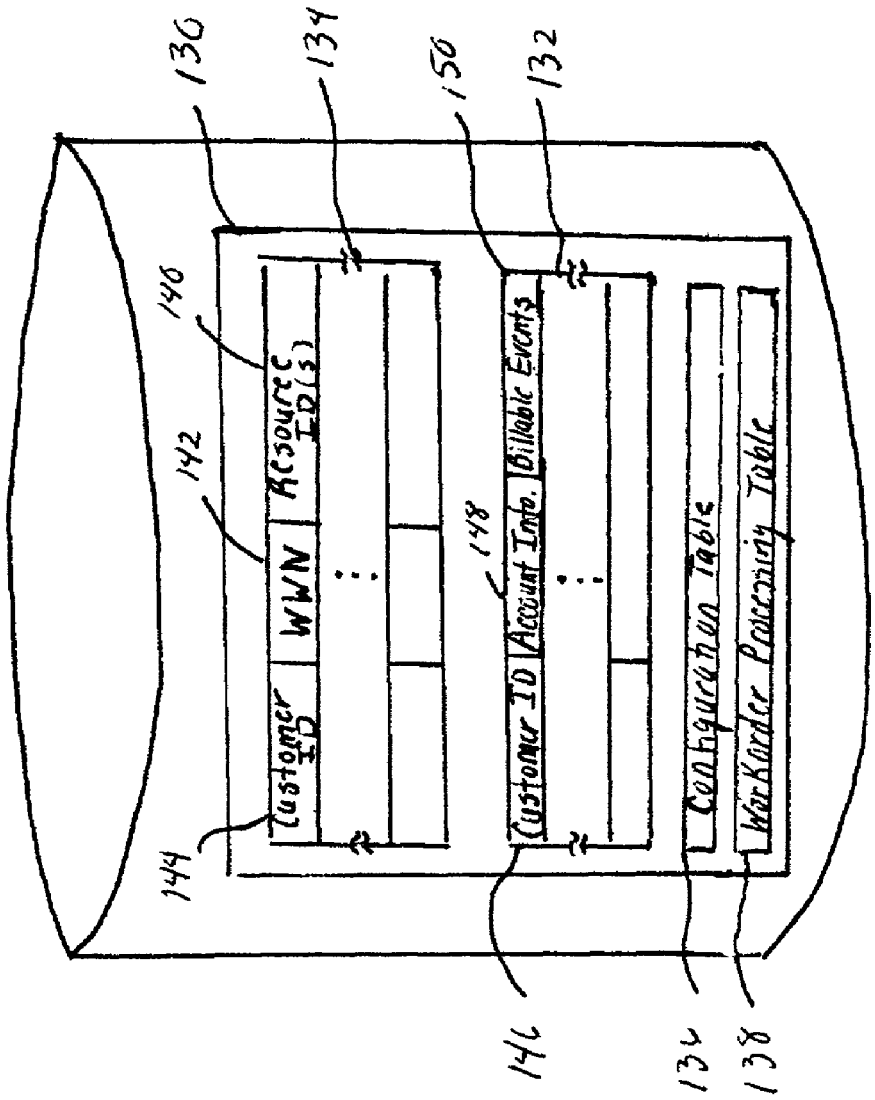
FIG. 6 is a depiction of various database tables created and maintained by the SPMS server.

FIG. 6 illustrates the database 26 in some detail. The database 26 includes various tables 130 that are created and maintained by the SPMS server 12. The tables include a customer account table 132, a customer-resource association table 134, one or more configuration tables 136 and one or more work order processing tables 138, among others (not shown). The customer-resource association table 134 includes a field or fields for storing resource identifiers 140, an equipment identifier field 142 for identifying the equipment (that is, server and HBA) connected to the resources specified in field(s) 140. In a Fibre Channel SAN configuration, the identifier stored in the field 142 is the WWN for such equipment. The information in these fields is the result of resource allocation and WWN-to-device mapping by the SPMS server 12 using tools such as the Symmetrix and Volume Logix tools. The table 134 further includes a customer ID field 144 for identifying the customer that "owns" the resources specified in field(s) 140 under the terms of a contract between the customer and the xSP as described earlier. The customer ID field 144 in the table 134 is populated during the registration process, as will be described. Each entry in the customer account table 132 includes a customer ID field 146 for storing an ID assigned to a customer account, fields for storing account information 148 and fields for storing billable events 150. The fields 146 and 148 are populated with information when a customer's accounted is created by the SPMS server 12. The association of customer ID with the resources that are used by that customer's server (server corresponding to the WWN) in the table 134 allows the SPMS server 12 to track usage of those resources by the customer and generate billable events, which the server 12 stores in the billable events field 150 of that customer's customer account entry in the customer accounts table 132. Preferably, the field 144 stores a customer account ID, but it will be appreciated that any customer information that identifies that customer and allows the SPMS server 12 to access the appropriate entry in the customer accounts table 132 could be used. The billable events can be provided to or are accessed by billing applications. The configuration tables 136 provides the SPMS server 12 with information about the hardware configuration of datacenter 24. The work order processing tables 138 maintain information about user-generated work order requests being processed by the xSP 14.

Figure 7:
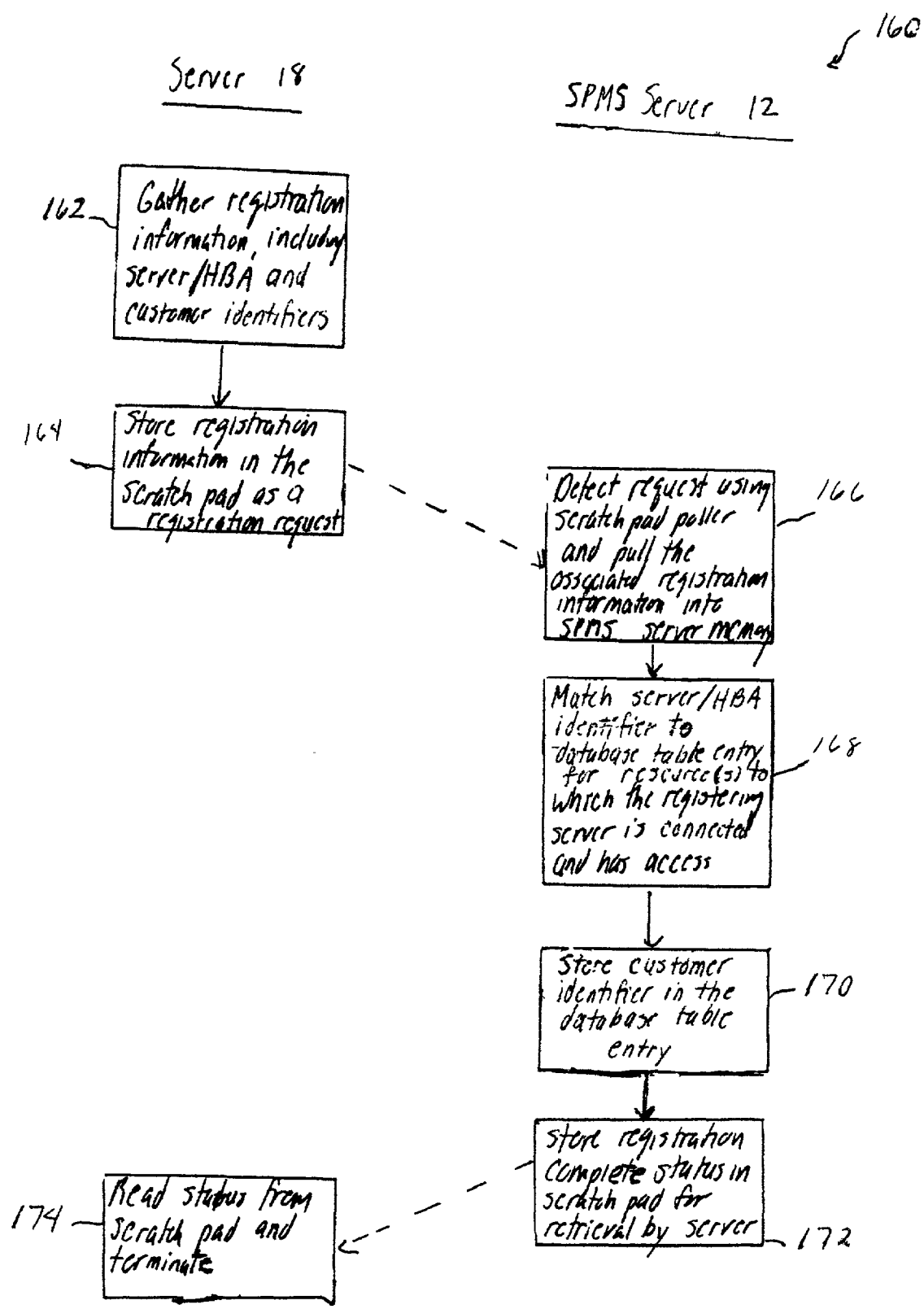
FIG. 7 is a flow diagram of an exemplary SPMS registration process.

Referring back to FIG. 5, the SRA 104 is used to associate customers and servers with the storage that they use. Once the customer account has been created, as described earlier, the SRA is installed and executed on each of the servers. The details of an overall registration process 160, including the processing of the registration application at the server 18 and the processing that occurs on the SPMS server side, is shown in FIG. 7. At the server, the application gathers server information (e.g., server name, IP address, operating system, etc.), HBA information (unique identifier such as WWN, vendor name, number of ports, etc.), and customer information (e.g., account ID, the domain to which the customer belongs) (step 162). The application causes the information to be provided to the SPMS server. Since there is no direct connection between the server and the SPMS server, as discussed above, the information is provided indirectly. In one embodiment, the scratch pad is used. Thus, the application causes the server 18 to store the registration information in the scratch pad 126 as a "registration request" (step 164). The SPMS server, which periodically searches the scratch pad for new information, detects the registration request, and pulls the associated registration information out of the storage 18 and into memory on the SPMS server (step 166). The SPMS server 12 matches the WWN passed down to the scratchpad to a WWN in the WWN field 142 in an entry in the database table 134 (shown in FIG. 6), that is, to the resources to which the registering server is connected and has access (step 168), and stores customer information from the registration request (i.e., customer account ID) in the customer ID field 144 of that entry, thereby associating a customer with the resources made available for that customer's use (170). The SPMS server stores the registration complete status in the scratch pad 126 for retrieval by the server 18 (step 172). The SRA executing on the server 18 reads the status, thus determining that the registration request has been processed by the SPMS server 12, returns such status to the server administrator and terminates the registration process (step 174).

Thus, the customer is required to run a registration application on the server in order to associate the already stored WWN of the HBA (for that server) and resource information with the customer's account. This enables billing and reporting services to be provided.

The SRA must accept as input from the CxSP customer information such as username, password, account ID and customer domain information. The SRA must generate information about the server. There are 4 levels of information that could be generated, including: 1) customer information (username, password, domain, account ID, etc.); 2) hostname, type and revision, HBA WWNs; 3) per HBA, file system and device mapping information; and 4) third party application information (Oracle, Veritas, etc.) Only the first two levels of information are required.

The basic purpose of the SRA 104 is to associate the HBA WWN running in the CxSP server with a customer, more specifically, a customer account. Other information about the customer's server environment can also be pushed down to the SPMS server 12 (via the scratch pad 126) to present more meaningful information about the customer, as discussed above.

It should be noted that the SRA not only needs to run at initial registration, but it also needs to run after any configuration change and/or file system/volume change. It could be implemented to run automatically as a daemon or boot-time script.

The WWN is a Fibre Channel specific unique identifier that is used at both ends and facilitates association of both end points (point-to-point). Preferably, the switch 18 is FC, and therefore the unique identifier is WWN and thus described; however, the switch could be a SCSI MUX, or even a network switch if NAS is part of the infrastructure.

Alternatively, because the SPMS server 12 can be reached via the Web server (TCP/IP), the SRA/server application could be implemented to produce a text file containing the registration information and the Web server 106 could be adapted to pull the registration information into SPMS server memory.

Registration could be manual procedure, but the automated registration process illustrated in FIG. 7 is efficient and therefore enhances productivity.

The scratch pad could be used for other types of communication as well. For example, a customer may want the storage allocation to be extended when the free space is below a certain threshold. The server may have a process to monitor free space and put a report in the mailbox. The SPMS retrieves the report and looks at the customer's policy, initiating a workorder to increase the size of the volume if the free space is below threshold. It could also be used to exchange information about billing events, information about server (QoS), as well as other types of information.

As mentioned earlier, there are various utilities 117 needed for proper SPMS server operation. In a Symmetrix environment, they include, for example, the Symmetrix API/CLI 118 for gathering configuration information, Volume Logix 120 for gathering/setting HBA-to-volume mapping information, as well as ECC components for use by the xSP administrator in monitoring the Symmetrix and a utility for managing the SPMS scratch pad.

The various areas of the database (of database server 26) will now be described in further detail. In a first area, the database stores information about the xSP, such as root password, xSP accounts such as Storage Administration, Corporate, Account Manager, etc. In a second area, the database stores information about each CxSP, including account information (users, domains, passwords, customer ID), servers and HBAs on the CxSP site, as was illustrated in FIG. 6. In a third area, the database maintains the list of metered objects that the metering agent 112 should produce. In a fourth area, the database stores xSP information pertaining to the "look and feel" of the Web pages that are served to the CxSP, allowing the xSP some control over the advertising and brand awareness that the xSP wants to communicate. Yet another area is set aside to store the polling information for all meterable objects.

The SPMS software 102 is modularized in a standard three layer architecture, as illustrated in FIG. 8. A database and API Access Layer (DBAPI) sits on the bottom of the system and handles all interaction with the database and storage system APIs. Residing above the DBAPI is a Business Functions Layer. The top most component is a presentation layer, which is responsible for generating HTML and Javascript.

Each of the three layers will now be described in further detail.

The DBAPI layer is accessed through a set of objects which are tightly coupled to database table definitions. The objects support two interfaces: per-field get and set methods which take primitive types (e.g., integers and strings), and XML.

The data model is broken down into a number of functional components: Domains and Users; Configuration Snapshot; Resource Ownership; Metering; Work orders; and Audits. Resource ownership is tracked via HBAs, but there could be other relationships such as ownership by port.

The Domains and Users component of the data model includes a DOMAINS table listing each domain, a USERS table listing each user, and an ACCESS table listing the privileges assigned to each user.

The Configuration Snapshot component of the data model contains a snapshot of the current data storage system (Symmetrix) configuration. A SYMMETRIX table lists the serial numbers of the managed Symmetrix units, and is populated by the SPMS server administrator. Other tables include the following: SYMM_CONFIG, DIRECTOR, DIRECTOR_PORT, DEVICE, and HBA_ACCESS, which are populated periodically by the configuration poller 108. Of these tables, the first four are populated by calls to the Symmetrix API, and the fifth table is populated from Volume Logix. Although configuration data model as shown is implemented to represent those aspects of a Symmetrix that need modeling, it could be extended to dynamically and generically take snapshots from a variety of different hardware devices in the xSP storage environment, e.g., FC switches, other disk systems, etc.

The Resource Ownership component contains information about host groups, hosts, HBAs and the assignment of devices to hosts. The tables in this component include the following: HOST_GROUP, HOST, HBA, and DEVICE_ALLOCATION.

The Metering component stores usage information generated periodically (e.g., daily) by the metering agent 112. The information may be fed to a third party billing system or used for historical usage reports. Data in the metering component are kept indefinitely. The metering information is be specifically geared toward Symmetrix modeling, but can be adapted to take into account the various types of other hardware that needs to be modeled.

The Work Orders component tracks user requests. It contains the work order processing tables 138 (from FIG. 6), including a WORK_ORDER table which contains a row for each work order, and an ACTIVITY table which contains a row for each modification of a work order. Work orders can be created or generated automatically by the SPMS server 12 in response to customer requests, or they can be manually generated (when necessary) by using the appropriate Web page form.

The Audit component provides a facility for logging audit and trace messages. Messages are identified by class (e.g., FATAL, ERROR, WARNING, SECURITY, etc.) and directed on a class by class basis to a dynamically configurable location (e.g., email message, log file, /dev/null, etc.).

The DBAPI object model encapsulates access to the database and Symmetrix APIs. The database operations are performed using JDBC. The database itself is implemented as an Oracle 8i database, but other databases can be used The classes in DBAPI are placed in a Java package, with each table in the database being represented by two classes, one to represent a single row and the other to iterate through multiple rows. The former is implemented by extending a DBObject class and the latter by extending a DBObjectCollection class.

DBObject and DBObjectCollection both derive from java.util.HashMap. The HashMap functionality is in both cases used to define query selection parameters (i.e., the SQL WHERE clause). In the former case, it is also used to set fields to define a row insert/update, or to retrieve the results of a row returned from a query.

Other classes used to implement functionality above and beyond what is provided by these two generic classes include the following. Device and Director represent Symmetrix volumes and directors, respectively. Both classes implement a syncDB( ) method to update the respective database tables with the current state of the volume or director they represent.

The Symmetrix object represents a Symmetrix configuration, and is tied to the SYMMETRIX database table. It implements a method syncDB( ) which brings the database update-to-date with the current configuration, as retrieved via the Symmetrix API. A Device object is instantiated and syncDB( ) invoked for each device within the frame. Likewise, a Director object will be instantiated and syncDB( ) invoked for each director.

As an optimization, the config_checksum field is examined to first determine if the configuration needs to be updated at all. If the checksum in the SymmConfig table matches that on disk, no additional work is necessary.

The business function layer implements operations on top of the DBAPI. While the DBAPI is data model focused, the business function layer is operation focused. The layer is divided in to a number of components, including daemons and security, which are described below.

Figure 9:
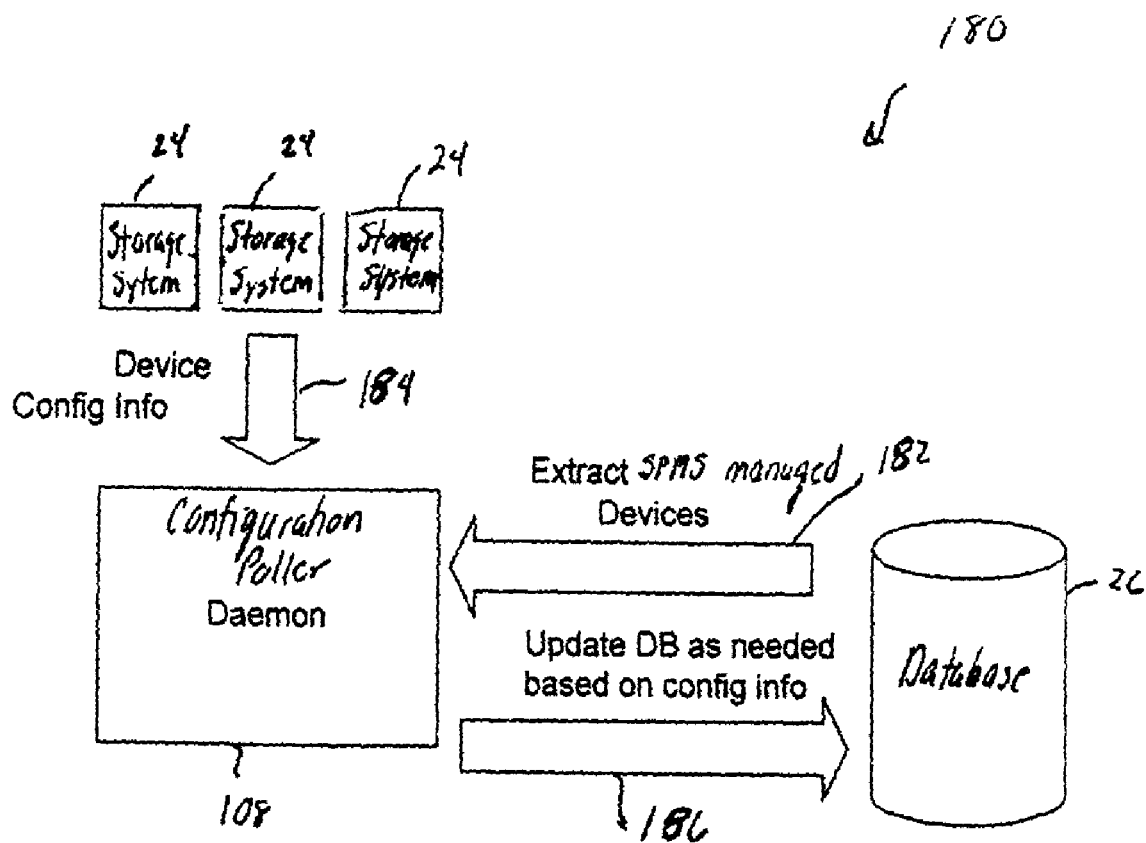
FIG. 9 is a depiction of activities performed by an SPMS server configuration poller.

The daemons include the configuration poller 108, the metering agent 112, and the alert daemon 114 as discussed earlier. The configuration poller 108 is responsible for keeping the database view of the hardware configuration up to date. It awakens periodically and calls syncDB( ) on each Symmetrix object returned by instantiating a SymmetrixCollection object and iterates through each result. As shown in FIG. 9, the configuration poller operation 180 includes extracting configuration information for SPMS managed devices from the database (step 182), obtaining device configuration information, including changes as well as information about new devices added to the datacenter (step 184), and updating the database configuration information for configuration changes and device additions as necessary (step 186).

The metering daemon 112 is responsible for generating billable event records based on hardware allocation. In one embodiment, it records allocation of devices and determines the number of paths to a device. The metering daemon 114 awakens periodically (say, daily) and generates a record in a SYMM_METER_ITEM table for each DEVICE_CATALOG item used by each host. For example, an example record would say that host 'xyz' is using 10 units of 9 G RAID-1 storage. Again, in the described embodiment, metering is specifically geared toward Symmetrix, but could be generalized to transparently monitor any device and dynamically control what is metered.

The SPMS server 12 authenticates users with a native database authentication mechanism. Alternatively, an LDAP registry solution could also be used. The SPMS server 12 automatically inserts an authentication check in each Web page. If a user has not already been authenticated, that user is directed to a login page and then returned to the location that the user was at when redirected. Authorization checking is implemented by maintaining a table listing the rights held by each user. It is the responsibility of each business function to check that the operation being invoked is authorized. An exemplary table listing the rights that may be granted to a user is shown in FIG. 10. It may be noted that most privileges are parameterized by a domain. For example, an administrator must have the "A/M/D user" (Add/Modify/Delete user) privilege on a domain in order to add a user to the domain.

The presentation layer consists of Extensible Server Pages (XSPs) and associated Extensible Style Sheet Language (XSL). The XSPs are XML pages which contain a mixture of XHTML (HTML which conforms to XML restrictions), generic XML, and embedded server-side Java. The XSPs produce XML output, which is transformed to pure HTML by applying an associated XSL (a rule-based language for transforming XML).

The XSP has the ability to define tag libraries which are somewhat like macros, but are written using the XSL language and are much more powerful. Unlike the XSL that is applied to transform page output to HTML, the XSL is applied to the page itself when it is compiled. For example, a tag for user authentication that expands to embed Java code in the page is defined. To differentiate this use of XSL, the files containing tag libraries are generally called logicsheets instead of stylesheets.

The presentation layer is implemented with components that make up a framework of templates to present business functions. The framework includes skeleton, form, menu and report components, which are implemented as XSL stylesheets templates aimed at corresponding XML DTD or schema definitions for business functions.

The skeleton is a page template that may be customized by the xSPs to add their own styling and branding. It includes logo, background, and title in the header band. It optionally shows the current page path (i.e. which menu or submenus this page comes from). A user may click on the path to go to previous menu pages. In addition, it provides one line space for messaging under the header band.

For example, a page title is specified as <SPMS:page title="User Authentication"> . . . </SPMS:page> in an XSP page, where the logicsheet tag SPMS:page symbolizes the starting point of project related page content. The logicsheet will post the title in the browser title bar as well as the header band. To enable authentication of a page, add <SPMS:authenticate/> tag below <SPMS:page> tag. The logicsheet redirects to the login form for a new session.

The menu component lays out the high-level business functions and their relationships for navigation purpose. The actual menu structure is defined in XML. An XSL is used to filter out menu items for each user depending upon the authorization rights. It inherits the skeleton but overwrites the main content presentation by adding a menu bar to the left side of the page below the header band. The menu bar has menu group title and menu items that entail the high-level functionality expressed in the business functions layer.

Form templates are inherited from either skeleton (e.g. login form) or menu template. HTTP Post is used to handle all the interactions with server-side business logic. All the visual widgets (e.g. lists, check-boxes, buttons) will be laid out according to the need of the business functions layer.

Report templates are inherited from either skeleton (for printing) or menu template. They have table layout as the main presentation. Canned reports may have graphics embedded as well.

Given the template categories listed above, business layer can be presented by detailed implementations of these templates.

Figure 11:
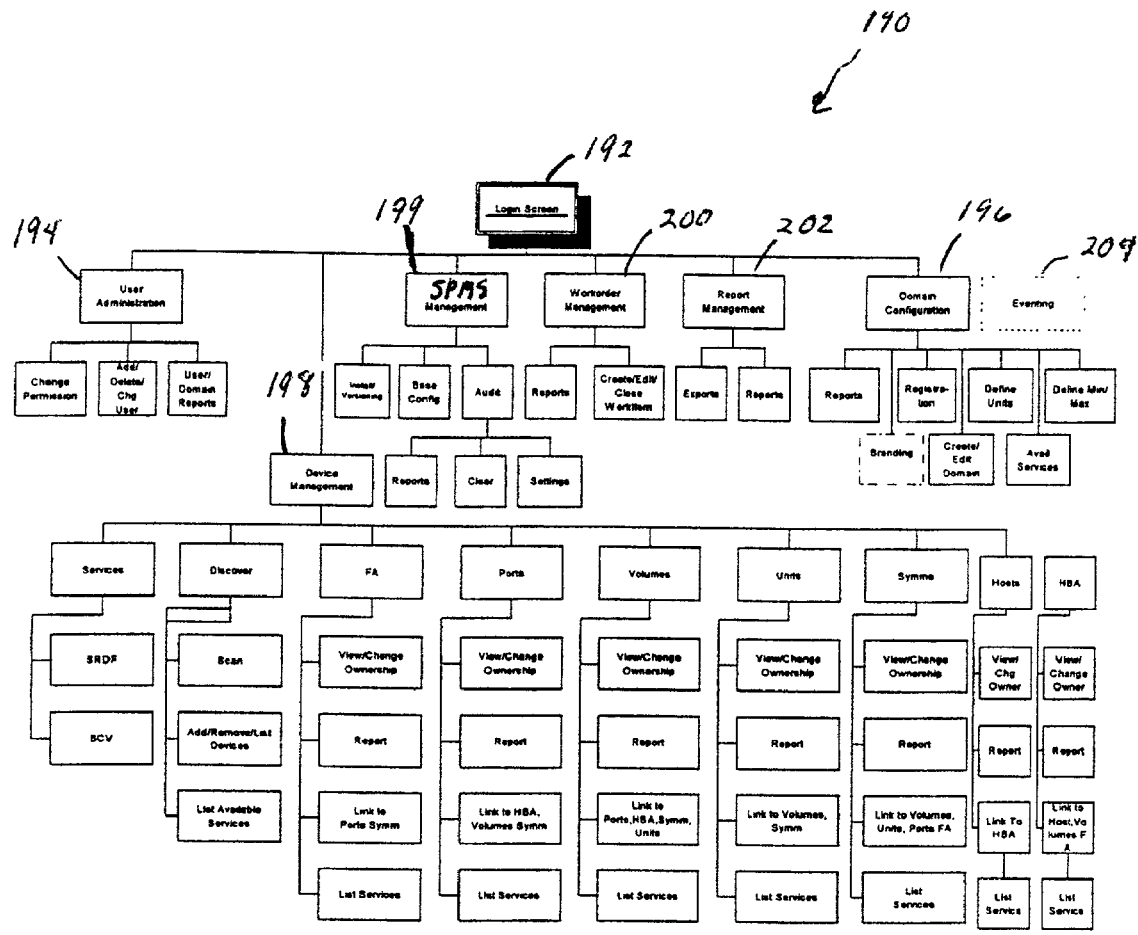
FIG. 11 is a depiction of various workflow screens supported by the SPMS server.

FIG. 11 describes SPMS workflow screens 190 that a user sees after logging into the Web Server 106 using a login screen 192. The workflow screens 190 include, at the top level, user administration 194, domain configuration 196, device management 198, SPMS management screen 199, workorder management 200 and report management 202. It will be understood that the different type of users (e.g., xSP administrator, CxSP administrator, CxSP server administrator, etc.) will not be able to access all of these screens and associated screen workflow. Filtering of what each user can see after logging in is achieved through the use of eXtensible Server Pages/security templates that are defined for each type of user.

The screens create workflow items in the database, where they are handled by an xSP device administrator; however, automation of workflow could be possible as well.

The content of the user administration screen 194 and associated lower level screens is, relate to domains and user accounts within domains. Depending on the privileges of the user viewing the screen, the user has the ability to view/change all domains or a subset of all domains, and/or view/change all users in all domains, or only a subset of users. Note that this screen and the others in its class do not include information about the domain's storage requirements. Rather, these screens are simply housekeeping screens for creating accounts and adding/removing users.

The device management screen 198 allows CxSP and xSP administrators to perform all of the "storage-specific" tasks. Again, depending on the user's security level they may or may not be able to "discover" all the attached storage systems, or change the domain ownership of a particular device.

The workorder management screen 200 allows a user to manage the SPMS server's underlying workorder management system. It is a database tracking of work that needs to be or has been performed. It allows a user to run reports on the workflow database entries, including looking up particular work items (filtered per domain, user, etc.) and running reports on all work items. The workorder screen could also be use to look at quality of service metrics based on how long it took to resolve a work request.

The report management screen 202 is the start screen for generating all of the reports that the user is capable of producing.

In addition, new classes can be installed to perform event management, as represented by screen 204, including: editing thresholds, arguments, and launch programs; assigning events to SPMS managed devices (e.g. volume); and removing an event from an SPMS managed device It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of providing data storage resources as a service, comprising:
   connecting to data storage resources in a datacenter controlled by a service provider;
   enabling the service provider to allocate the data storage resources to one or more customers;
   establishing contracts between the customers and the service provider to indicate allocation of the data storage resources by customer;
   maintaining information about the datacenter and customers to whom the service provider has allocated the data storage resources, wherein maintaining comprises producing configuration information for the connected data storage resources and producing customer information in a table that associates the customers with the data storage resources allocated to those customers;
   tracking usage of the allocated data storage resources by customer based on the configuration information and the customer information in the table to produce usage information;
   assigning multiple levels of ownership to a billable device associated with the allocated data storage resources based on the contracts, wherein the multiple levels of ownership comprise ownership by a service provider including assigning responsibility of administration of the billable device and ownership by a customer of the service provider;
   using the table to indicate ownership of the allocated data storage resources by customer based on the contracts, an entry in the table comprising:
     a first field indicating the billable device;
     a second field indicating equipment associated with the billable device in the first field; and
     a third field indicating ownership of the billable device in the first field; and
   using the usage information to generate billing information associated with the billable device.

2. The method of claim 1, further comprising:
   associating user privileges with the ownership.

3. The method of claim 2, further comprising:
   providing a first interface usable by the service provider to manage the connected data storage resources; and
   providing a second interface usable by customers to manage respective allocated data storage resources.

4. The method of claim 3, wherein the first interface enables an administrator of the service provider to view and modify the configuration information.

5. The method of claim 3, wherein the interfaces enable administrators of the service provider and customer to both view and modify the ownership information and associated user privileges.

6. The method of claim 3, wherein the allocated data storage resources comprise a storage device and a storage-related service available for the storage device, and wherein the second interface enables a customer to view and request that the storage-related service be performed.

7. The method of claim 6, further comprising:
processing the request for the storage-related service.

8. The method of claim 1, wherein the allocated data storage resources for each customer are used by the equipment, and the equipment comprises at least one server, the server being connected to the data allocated storage resources of the customer by an interconnect.

9. The method of claim 8, wherein the interconnect is a Fibre Channel interconnect.

10. The method of claim 9, wherein the customer information includes a World Wide Name (WWN) associated with a host bus adapter that couples the server to the Fibre Channel interconnect.

11. The method of claim 10, wherein ownership by customer is tied to the WWN associated with the host bus adapter.

12. The method of claim 3, further comprising providing a Web server to export HTTP interface corresponding to the first and second interfaces.

13. The method of claim 3, wherein the second interface provides to the customer a functionality that is different from a functionality provided by the first interface to the service provider.

14. The method of claim 1 wherein ownership by customer comprises ownership shared by more than one customer.

15. A method of providing data storage resources as a service, comprising:
connecting to data storage resources in a datacenter controlled by a service provider;
enabling the service provider to allocate the data storage resources to one or more customers;
establishing contracts between the customers and the service provider to indicate allocation of the data storage resources by customer;
maintaining information about the datacenter and customers to whom the service provider has allocated the data storage resources, wherein maintaining comprises producing configuration information for the connected data storage resources and producing customer information in a first table that associates the customers with the data storage resources allocated to those customers;
tracking usage of the allocated data storage resources by customer based on the configuration information and the customer information in the first table to produce usage information;
assigning multiple levels of ownership to a billable device associated with the allocated data storage resources based on the contracts, wherein the multiple levels of ownership comprise ownership by a service provider including assigning responsibility of administration of the billable device and ownership by a customer of the service provider;
using the first table to indicate ownership of the allocated data storage resources by customer based on the contracts, an entry in the first table comprising:
a first field indicating the billable device;
a second field using a unique identifier to indicate equipment connected to the billable device in the first field; and
a third field indicating ownership of the billable device in the first field; and
using the usage information to generate billing information associated with the billable device in a second table, an entry in the second table comprising:
a first field indicating customer account information;
a second field indicating a customer identifier associated with the account information in the first field; and
a third field indicating a billable event associated with the customer identifier in the second field.

16. The method of claim 15, further comprising:
associating user privileges with the ownership;
providing a first interface usable by the service provider to manage the connected data storage resources;
providing a second interface usable by customers to manage respective allocated data storage resources; and
providing a Web server to export HTTP interface corresponding to the first and second interfaces.

17. The method of claim 16, wherein the interfaces enable administrators of the service provider and customer to view and modify the ownership information and associated user privileges.

18. The method of claim 16, wherein the allocated data storage resources comprise a storage device and a storage-related service available for the storage device, and wherein the second interface enables a customer to view and request that the storage-related service be performed, and further comprising processing the request for the storage-related service.

19. The method of claim 16, wherein the allocated data storage resources for each customer are used by the equipment, and the equipment comprises at least one server, the server being connected to the allocated data storage resources of the customer by an interconnect, wherein the interconnect is a Fibre Channel interconnect and the customer information includes a World Wide Name (WWN) associated with a host bus adapter that couples the server to the Fibre Channel interconnect, and wherein ownership by customer is tied to the WWN associated with the host bus adapter.

20. The method of claim 16, wherein the second interface provides to the customer a functionality that is different from a functionality provided by the first interface to the service provider, wherein ownership by customer comprises ownership shared by more than one customer.

* * * * *